US011118095B2

(12) United States Patent
Fu et al.

(10) Patent No.: US 11,118,095 B2
(45) Date of Patent: Sep. 14, 2021

(54) COMPOSITIONS AND METHODS FOR SERVICING SUBTERRANEAN WELLS

(71) Applicant: SCHLUMBERGER TECHNOLOGY CORPORATION, Sugar Land, TX (US)

(72) Inventors: Diankui Fu, Kuala Lumpur (MY); Kong Teng Ling, Kuala Lumpur (MY); Daniel Thomas Melice, Kuala Lumpur (MY)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 12 days.

(21) Appl. No.: 16/333,601

(22) PCT Filed: Sep. 15, 2016

(86) PCT No.: PCT/MY2016/000058
§ 371 (c)(1),
(2) Date: Mar. 15, 2019

(87) PCT Pub. No.: WO2018/052280
PCT Pub. Date: Mar. 22, 2018

(65) Prior Publication Data
US 2019/0211253 A1 Jul. 11, 2019

Related U.S. Application Data

(63) Continuation of application No. PCT/MY2016/000058, filed on Jun. 15, 2016.

(51) Int. Cl.
| *E21B 37/06* | (2006.01) |
| *C09K 8/528* | (2006.01) |
| *C09K 8/02* | (2006.01) |
| *C09K 8/52* | (2006.01) |
| *C09K 8/03* | (2006.01) |
| *C09K 8/035* | (2006.01) |

(52) U.S. Cl.
CPC .............. *C09K 8/528* (2013.01); *C09K 8/02* (2013.01); *C09K 8/032* (2013.01); *C09K 8/035* (2013.01); *C09K 8/52* (2013.01); *C09K 2208/08* (2013.01); *C09K 2208/32* (2013.01)

(58) Field of Classification Search
CPC ........... C09K 8/52; E21B 37/06; E21B 37/00
See application file for complete search history.

(56) References Cited

U.S. PATENT DOCUMENTS

| 6,886,635 | B2 | 5/2005 | Hossaini et al. | |
| 2001/0036905 | A1* | 11/2001 | Parlar | C09K 8/52 507/200 |
| 2005/0252659 | A1* | 11/2005 | Sullivan | C09K 8/74 166/280.1 |
| 2006/0166837 | A1 | 7/2006 | Lin et al. | |
| 2011/0186293 | A1* | 8/2011 | Gurmen | C09K 8/536 166/276 |
| 2014/0367091 | A1* | 12/2014 | Tour | B82Y 30/00 166/250.01 |
| 2016/0053160 | A1 | 2/2016 | Nguyen et al. | |
| 2016/0122616 | A1* | 5/2016 | Fu | C09K 8/40 166/293 |
| 2016/0130497 | A1* | 5/2016 | Liu | C09K 8/516 166/312 |
| 2016/0152884 | A1* | 6/2016 | Ravitz | C09K 8/52 507/241 |
| 2016/0177162 | A1 | 6/2016 | Nguyen et al. | |
| 2016/0208157 | A1* | 7/2016 | Vo | C09K 8/80 |
| 2017/0088763 | A1* | 3/2017 | Sui | C09K 8/34 |
| 2017/0096592 | A1* | 4/2017 | Misra | C09K 8/516 |
| 2018/0223180 | A1* | 8/2018 | Hall | C09K 8/00 |

FOREIGN PATENT DOCUMENTS

| WO | 2013160334 A1 | 10/2013 |
| WO | 2014165347 A1 | 10/2014 |

OTHER PUBLICATIONS

International Search Report and Written Opinion issued in International Patent Appl. No. PCT/MY2016/000058 dated Jun. 13, 2017; 12 pages.
Zamora M and Stephens M: "Drilling Fluids," in Economides MJ, Watters LT and Dunn-Norman S (eds): Petroleum Well Construction, Wiley, Chichester (1998) 119-142.
International Preliminary Report on Patentability issued in International Patent Appl. No. PCT/MY2016/000058 dated Mar. 28, 2019; 9 pages.

* cited by examiner

*Primary Examiner* — Kipp C Wallace

(57) ABSTRACT

Treatment fluids containing salts, surfactants, mutual solvents and fibers may be used to remove wellbore filter cakes that have been deposited by drilling fluids. The drilling fluids may be water-base, oil-base, synthetic-base or emulsions. The fibers may be selected from polylactic acid, celluloses, polyesters, polyvinyl alcohols and polyethylene terephthalates. A combination of straight and crimped fibers is present in the treatment fluid.

20 Claims, No Drawings

COMPOSITIONS AND METHODS FOR SERVICING SUBTERRANEAN WELLS

BACKGROUND

The statements in this section merely provide background information related to the present disclosure and may not constitute prior art.

This disclosure relates to compositions and methods for removing drilling fluid filtercakes from subterranean wellbores.

Drilling fluids, also referred to as drilling muds, facilitate the drilling process by suspending cuttings, controlling pressure, stabilizing exposed rock, providing buoyancy and cooling and lubricating the drill bit. As drilling fluid circulates in the wellbore, a filter cake often forms along the formation rock surface. The filter cake may be beneficial in that it provides fluid-loss control, preventing the liquid phase of the drilling fluid from escaping into the formation-rock matrix. This helps preserve the designed chemical and rheological properties of the drilling fluid, and also minimizes near-wellbore formation damage (i.e., a permeability loss that may impair subsequent production of hydrocarbons). Before well production begins, particularly in open-hole completions that are not perforated, it is desirable to remove the filtercake and maximize well productivity.

Drilling fluid filter cake contains a mixture of inorganic and organic solids. The permeability of the filter cake may be low enough to impair production. Filter cake removal is often enhanced by fluid treatments that contain a suite of chemicals (e.g., acids, chelating agents and enzyme breakers) designed to dissolve and break down the solids and polymers. Such treatments may involve long soaking times, up to a few days, to achieve the desired result.

Effective dissolution and removal of mineral solids within the filter cake may be particularly problematic. When the organic fraction of the filtercake is removed, the filter cake permeability may be higher and the treatment fluid may bypass the minerals and leak into the formation rock. Removal of a common drilling fluid weighting material, barite ($BaSO_4$), may be particularly challenging because the mineral has limited solubility in almost many chemical solvents.

SUMMARY

The present disclosure describes improved compositions for removing drilling fluid filter cakes from formation rock surfaces. The drilling fluid may be water-base, oil-base or an emulsion.

In an aspect, embodiments relate to well cleaning compositions. The composition comprise a carrier fluid, a salt, a surfactant, a mutual solvent and at least two fibers selected from the group consisting of polylactic acid, natural celluloses, polyesters, polyvinyl alcohol and polyethylene terephthalate. The fibers have lengths between 1 mm and 20 mm, and diameters between 10 μm and 50 μm. A first fiber is a straight fiber and a second fiber is a crimped fiber.

In a further aspect, embodiments relate to methods for cleaning a wellbore. A well is drilled with an oil-base mud, a water-base mud, a synthetic-base mud or an emulsion mud. A mud filter cake is deposited on a wellbore wall. A well cleaning composition is prepared that comprises a carrier fluid, a salt, a surfactant, a mutual solvent and at least two fibers selected from the group consisting of polylactic acid, natural celluloses, polyesters, polyvinyl alcohol and polyethylene terephthalate. The fibers have lengths between 1 mm and 20 mm, and diameters between 10 μm and 50 μm. The well cleaning composition is placed in the wellbore, thereby removing the mud filter cake from the wellbore wall. A first fiber is a straight fiber and a second fiber is a crimped fiber.

In yet a further aspect, embodiments relate to methods for treating a well. A well is drilled with an oil-base mud, a water-base mud, a synthetic-base mud or an emulsion mud. A mud filter cake is deposited on a wellbore wall. A well cleaning composition is prepared that comprises a carrier fluid, a salt, a surfactant, a mutual solvent and at least two fibers selected from the group consisting of polylactic acid, natural celluloses, polyesters, polyvinyl alcohol and polyethylene terephthalate. The fibers have lengths between 1 mm and 20 mm, and diameters between 10 μm and 50 μm. The well cleaning composition is circulated in the well, thereby removing the mud filtercake from the wellbore wall. A first fiber is a straight fiber and a second fiber is a crimped fiber.

This summary is provided to introduce a selection of concepts that are further described below in the detailed description. This summary is not intended to identify primary features of the claimed subject matter, nor is it intended to be used as an aid in limiting the scope of the claimed subject matter.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

Embodiments relate to compositions and methods for removing drilling fluid filter cake from formation rock surfaces in a wellbore.

As mentioned earlier, drilling fluids may be water-base, oil-base, synthetic-base or emulsions. The emulsions may be water-in-oil emulsions. The drilling fluids contain both organic and inorganic components. For example, water-base fluids may contain a plethora of materials for various purposes. Weighting agents include barite, hematite and calcium carbonate. Viscosifiers include bentonite, attapulgite, sepiolite, beneficiated bentonite, biopolymers (xanthan and welan gum), guar gum, hydroxyethyl cellulose (HEC) and mixed-metal hydroxides (MMH). Filtration control agents include starch, cellulose polysaccharide, carboxymethyl cellulose (CMC) and polyacrylates. Salts include sodium chloride, potassium chloride, calcium chloride. Lost circulation materials include nut shells, mica and cellophane flakes.

Petroleum oils are used for the continuous phase of oil-base muds. Crude oil may be employed; however, the use of diesel oil and low-toxicity mineral oils is more commonplace today. Oil-base fluids may contain the same inorganic weighting materials and lost circulation materials as water-base fluids.

Synthetic-base fluids are composed of man-made non-aqueous fluids with lower toxicity than oil-base fluids. Such fluids include esters, ethers, polyalphaolefins and acetals. Synthetic-base fluids may contain the same inorganic weighting materials and lost circulation materials as water-base fluids.

A complete description of drilling fluids and their use may be found in the following publication. Zamora M and Stephens M: "Drilling Fluids," in Economides M J, Watters L T and Dunn-Norman S (eds): *Petroleum Well Construction*, Wiley, Chichester (1998) 119-142.

For each aspect, the carrier fluid of the composition may be composed solely of water. The water may be fresh water, sea water, produced water or a brine. The salt may be a halide salt. Halide salts may include sodium chloride, potassium chloride, cesium chloride, calcium chloride, sodium bromide, potassium bromide and cesium bromide. The salt may be present in the composition at a concentration between 0.5 wt % and 35 wt %, or 2.0 wt % and 20 wt %, or 5.0 wt % and 15 wt %.

For each aspect, the mud filter cake may comprise barite.

For each aspect, the fibers may comprise one or more members or the group consisting of natural celluloses, polyesters, polyvinyl alcohol and polyethylene terephthalate. The fibers may further comprise polylactic acid. The natural celluloses may include fibers made from wood pulp, bamboo, cotton, flax, hemp, jute and ramie. The fibers may be present in the composition at a concentration between 0.2 wt % and 2 wt %, or 0.4 wt % and 1.8 wt %, or 0.6 wt % and 1.4 wt %.

For each aspect, the fiber length may be between 1 mm and 20 mm, or between 3 mm and 10 mm. The fiber diameter may be between 10 μm and 50 μm, or between 10 μm and 20 μm.

For each aspect, the fibers may be crimped. For this disclosure, crimps are defined as undulations, waves or a succession of bends, curls and waves in a fiber strand. The crimps may occur naturally, mechanically or chemically. Crimp has many characteristics, among which are its amplitude, frequency, index and type. For this disclosure, crimp is characterized by a change in the directional rotation of a line tangent to the fiber as the point of tangent progresses along the fiber. Two changes in rotation constitute one unit of crimp. Crimp frequency is the number of crimps or waves per unit length of extended or straightened fiber. Another parameter is the crimping ratio, K1 (Eq. 1).

$$K1 = \frac{Lv - Lk}{Lv}, \qquad \text{(Eq. 1)}$$

where Lk is the length of the crimped fiber in the relaxed, released state; and Lv is the length of the same fiber in the stretched state (i.e., the fiber is practically rectilinear without any bends). Mixtures of crimped fibers and straight fibers may also be employed. The concentration ratio between crimped and straight fibers may vary from about 10:90 to 90:10, or between 25:75 and 75:25, or between 40:60 and 60:40 by weight.

For this disclosure, the fibers may have a crimp frequency between 1/cm and 6/cm, or 1/cm and 5/cm or 1/cm and 4/cm. The K1 value may be between 2 and 15, or between 2 and 10 or between 2 and 6.

For each aspect, the surfactant may be non-ionic, anionic or zwitterionic or combinations thereof. Suitable non-ionic surfactants may include nonionic surfactants may comprise long chain alcohols, ethoxylated alcohols, polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide DEA, cocamide MEA, dodecyldimethylamine oxide, block copolymers of polyethylene glycol or polypropylene glycol, or polyethoxylated tallow amine or combinations thereof. Suitable anionic surfactants may include ammonium lauryl sulfate, sodium lauryl sulfate, sodium laureth sulfate, sodium myreth sulfate, dioctyl sodium sulfosuccinate, perfluorooctane sulfonates, perfluorobutanesulfonates, alkylbenzene sulfonates, alkylaryl ether phosphates, alkyl ether phosphates, alkyl carboxylates, sarcosinates, perfluorononanoates, or perfluorooctanoates or combinations thereof. Suitable zwitterionic surfactants may include sultaines or betaines or combinations thereof. The surfactant may be 3-[(3-Cholamidopropyl)dimethylammonio]-1-propanesulfonate, cocamidopropyl hydroxysultaine, or cocamidopropyl betaine or a combination thereof. The surfactant may be present in the composition at a concentration between 0.2 wt % and 15 wt %, or between 1.0 wt % and 10 wt %, or between 2.0 wt % and 5.0 wt %.

For each aspect, suitable mutual solvents may include methanol, ethanol, ethylene glycol, propylene glycol, isopropanol or 2-butoxyethanol or a combination thereof. The mutual solvent may be 2-butoxyethanol. The mutual solvent may be present at a concentration between 1.0 wt % and 20 wt %, or between 3.0 wt % and 15 wt %, or between 5.0 wt % and 10 wt %.

For each aspect, the composition may further comprise a corrosion inhibitor. Suitable corrosion inhibitors may include acetylenic alcohols. The corrosion inhibitor may be an organic acid, including formic acid. The corrosion inhibitor may be present in the composition at a concentration between 0.1 wt % and 5.0 wt %, or 0.2 wt % and 2.5 wt %, or 0.5% and 2.0 wt %.

For the aspect pertaining to well cleaning and well treatment methods, the composition may remain stationary in the well for a period between 0.5 hr and 24 hr, or 2.0 hr and 12 hr, or 3.0 hr and 6.0 hr.

For the aspects pertaining to the well cleaning and well treatment methods, the composition may be circulated out of the well.

The foregoing is further illustrated by reference to the following examples, which are presented for purposes of illustration and are not intended to limit the scope of the present disclosure.

EXAMPLES

The following examples serve to further illustrate the disclosure.

The following test method was employed in each of the following examples. A dynamic fluid-loss cell was employed to simulate the filtration process that takes place in a wellbore during drilling. The fluid-loss cell was a Model 7120 Stirred Fluid Loss Tester, available from Chandler Engineering, Broken Arrow, Okla., USA.

A porous ceramic disk was employed to simulate the formation rock. The dimensions of the disk were 6.30 cm (2.48 in.) in diameter and 0.64 cm (0.25 in.) thick. The ceramic disk was saturated in 2% KCl solution for one hour, then weighed. The weight was recorded as W1. The disk was then placed in the test cell.

The heating jacket of the apparatus was set to 50° C. 200 mL of drilling fluid was stirred before being poured into the test cell. The test cell was sealed and pressured to 300 psi [2.1 MPa] for a period of 2 hours. Then, the cell was allowed to cool and the pressure was released. The remaining drilling fluid was carefully removed from the test cell. The ceramic disk, upon which a filter cake had been deposited was weighed and the result was recorded as W2.

The ceramic disk was then reinserted into the test cell. 200 mL of treatment fluid was then carefully added along the inner wall of the test cell, ensuring that the flow of treatment fluid did not disturb the filter cake. The test cell was resealed and reheated to 50° C. The cell was repressurized to 100 psi [0.7 MPa]. The paddle stirrer inside the test cell was then turned on at a rotational speed of 500 RPM. The stirring period was 10 min. Following the stirring period, the test cell was opened and the ceramic disk was removed and reweighed. The result was recorded as W3. The percentage of drilling fluid removed from the ceramic disk was then calculated by the following equation.

$$\text{Mud Removal (\%)} = 1 - \left(\frac{W3 - W1}{W2 - W1}\right) \times 100 \quad \text{(Eq. 2)}$$

Example 1

A water-base drilling fluid was prepared with the composition presented in Table 1. The fluid density was 11.5 lbm/gal (1,380 kg/m³).

TABLE 1

Water-base drilling fluid formulation.

| Ingredient | Concentration (kg/m³) |
| --- | --- |
| Water | 366 |
| KCl | 81.2 |

TABLE 1-continued

Water-base drilling fluid formulation.

| Ingredient | Concentration (kg/m³) |
| --- | --- |
| 8 wt % NaBr Brine | 763 |
| Xanthan Gum | 3.6 |
| Starch | 17.1 |
| Shale Stabliizer | 29.9 |
| MgO | 1.4 |
| Biocide | 0.6 |
| CaCO₃ (6-15 microns) | 57.0 |
| CaCO₃ (16-29 microns) | 57.0 |

The drilling fluid contained additives that are available from MI-SWACO, Houston, Tex., USA. The xanthan gum was FLOVIS PLUS, the starch was FLO-TROL, the shale stabilizer was KLAGARD and the CaCO₃ was SAFECARB 10 and SAFECARB 20.

A base cleaning composition was prepared with the composition presented in Table 2.

TABLE 2

Base cleaning composition.

| Ingredient | Concentration (vol %) |
| --- | --- |
| NaBr Brine (11.5 lbm/gal [1,380 kg/m³]) | 92.3 |
| non-ionic surfactant (amine oxide) | 5.0 |
| 2-butoxyethanol | 2.5 |
| organic acid corrosion inhibitor | 0.2 |

Various fibers were added to the base cleaning composition at a concentration of 60 lbm/1,000 gal (7.17 kg/m³). The fibers are listed in Table 3.

TABLE 3

Test fibers.

| Fiber | Composition | Dimensional Information |
| --- | --- | --- |
| 1 | Polylactic Acid (crimped) | 6 mm length; 13 μm diameter |
| 2 | Polylactic Acid (straight) | 6 mm length; 12 μm diameter |
| 3 | Polyethylene Terephthalate | 6 mm length; 12 μm diameter |
| 4 | Polyvinyl Alcohol | 1.5 mm length; 12 μm diameter |
| 5 | Cellulose (Bamboo) | 10 μm diameter |
| 6 | Nylon-6 | 6 mm length; 13 μm diameter |
| 7 | Polylactic Acid (straight) | 6 mm length; 40 μm diameter |
| 8 | Polylactic Acid (straight) | 6 mm length; 40 μm diameter |

Experiments were conducted with the fibers of Table 3 according to the procedure described above. The results are shown in Table 4.

TABLE 4

Mud removal results-water base drilling fluid.

| Fiber | Mud Removal (%) |
| --- | --- |
| No Fiber (control) | 0.0 |
| 1 | 40.8 |
| 2 | 59.0 |
| 3 | 39.1 |
| 4 | 52.4 |
| 5 | 13.1 |

TABLE 4-continued

Mud removal results-water base drilling fluid.

| Fiber | Mud Removal (%) |
|---|---|
| 6 | 35.0 |
| 7 | 13.6 |
| 8 | 25.0 |
| 1 (50 wt %); 7 (50 wt %) | 64.0 |
| 1 (50 wt %); 8 (50 wt %) | 59.8 |

It is notable that a synergistic effect was observed when mixtures of crimped and straight polylactic acid fibers were tested (e.g., Fiber 1 and Fiber 7, and Fiber 1 and Fiber 8). Compared to Fiber 1 alone, the mud removal performance improvement resulting from using a mixture of crimped and straight fibers varied from about 50% to 60%. Without wishing to be held to any particular theory, the improved mud removal performance may be due to a scrubbing action of the fiber combination.

Example 2

An oil-base drilling fluid was prepared with the composition presented in Table 5. The mud density was 1,320 kg/m$^3$ (11.0 lbm/gal) and barite was employed as a weighting material. The base cleaning composition of Table 2 was employed in the mud removal experiments.

TABLE 5

Oil-base drilling fluid formulation.

| Ingredient | Concentration (vol %) |
|---|---|
| Crystalline silica, Quartz | 0.3 |
| Calcium Hydroxide | 0.3 |
| Calcium Chloride | 8.0 |
| Paraffin based petroleum oil | 60.0 |
| Barium Sulfate | 11.4 |

Mud removal tests were performed with the cleaning composition of Table 2 containing no fibers (as a control) and 60 lbm/1,000 gal (7.17 kg/m$^3$) of Fiber 1. The mud removal achieved by the control fluid was 0.00%, while that achieved by the fluid containing fibers was 95.50%.

Example 3

The ability of the disclosed compositions to remove a mud filter cake containing was also investigated by measuring the regained permeability of ceramic disks.

A porous ceramic disk was employed to simulate the formation rock. The dimensions of the disk were 6.30 cm (2.48 in.) in diameter and 0.64 cm (0.25 in.) thick. The ceramic disk was saturated in 2% KCl solution under vacuum for one hour.

The disk was then loaded into a Chandler dynamic fluid-loss cell filled with 2% KCl. The KCl solution was pumped through the ceramic disk at various flow rates and the differential pressure in the cell was recorded. The initial permeability of the disk was than calculated by Darcy's Law.

Next, the fluid-loss cell was heated to 50° C. and filled with a drilling fluid described. The ceramic disk remained in the cell. The cell was pressurized to 2.1 MPa (300 psi), and mud filtrate was collected over a 4-hr period.

The cell was cooled to ambient temperature, the pressure was released, and residual mud was carefully removed.

The ceramic disk was then reinserted into the fluid-loss cell. 200 mL of treatment fluid, containing 60 lbm/1,000 gal (7.17 kg/m3) of Fiber 1, was then carefully added along the inner wall of the test cell, ensuring that the flow of treatment fluid did not disturb the filter cake. The test cell was resealed and reheated to 50° C. The cell was repressurized to 0.7 Mpa (100 psi). The paddle stirrer inside the test cell was then turned on at a rotational speed of 500 RPM. The stirring period was 10 min.

The ceramic disk was replaced in the fluid-loss cell and the fluid-loss cell was then filled with 2% KCl solution. The final permeability of the disk was determined as described above by flowing the KCl solution through the disk at various rates and measuring the differential pressure. The regained permeability was then calculated by the following equation.

$$\text{Regained Permeability (\%)} = \left(\frac{\text{Final Permeabiility}}{\text{Initial Permeabiility}}\right) \times 100 \quad \text{(Eq. 3)}$$

This test was performed with the water-base mud described in Table 1 and the oil-base mud described in Table 5. The results, shown in Table 6, show that the fibers in the cleaning solution effectively removed the filter cake containing barite.

TABLE 6

Regained permeabilities from ceramic disks treated with drilling muds.

| | Water-base Mud | Oil-base Mud |
|---|---|---|
| Initial Permeability, mD | 136 | 124 |
| Final Permeability, mD | 22 | 116 |
| Regained Permeability, % | 16 | 94 |

Although just a few example embodiments have been described in detail above, those skilled in the art will readily appreciate that many modifications are possible in the example embodiments without materially departing from this disclosure. Accordingly, each modification is intended to be included within the scope of this disclosure as defined in the following claims.

The invention claimed is:

1. A method for cleaning a wellbore, comprising:
   (i) drilling a well with a water-base mud, oil-base mud, a synthetic-base mud or an emulsion mud;
   (ii) depositing a mud filtercake on a wellbore wall;
   (iii) preparing a well cleaning composition that comprises a carrier fluid, a salt, a surfactant, a mutual solvent, and at least two fibers selected from the group consisting of natural celluloses, polylactic acid, polyesters, polyvinyl alcohol and polyethylene terephthalate, wherein the at least two fibers have lengths between 1 mm and 20 mm and diameters between 10 µm and 50 µm; and
   (iv) placing the well cleaning composition in the well, thereby removing the mud filtercake from the wellbore wall; wherein a first fiber of the at least two fibers is a straight fiber and a second fiber of the at least two fibers is a crimped fiber, and wherein a first length of the straight fiber is about equal to a second length of the crimped fiber, and a first diameter of the straight fiber is substantially larger than a second diameter of the crimped fiber.

2. The method of claim 1, wherein the crimped fiber has a crimping ratio, K1, between 2 and 15.

3. The method of claim 1, wherein a straight fiber:crimped fiber weight ratio varies between 10:90 and 90:10.

4. The method of claim 1, wherein the filtercake removal arises from a scrubbing action performed by the at least two fibers.

5. The method of claim 1, wherein the mud filtercake comprises barite.

6. The method of claim 1, wherein the carrier fluid consists of water.

7. The method of claim 1, wherein the salt is a halide salt, and wherein the halide salt is present at a concentration between 0.5 wt % and 35 wt %.

8. The method of claim 1, wherein the mutual solvent is 2-butoxyethanol.

9. The method of claim 1, wherein the well cleaning composition further comprises a corrosion inhibitor, and wherein the corrosion inhibitor comprises an organic acid.

10. The method of claim 1, wherein the at least two fibers are present at a concentration between 0.2 wt % and 2 wt %.

11. The method of claim 1, wherein the well cleaning composition remains stationary in the well for a period between 0.5 hr and 24 hr.

12. The method of claim 1, wherein the well cleaning composition is circulated out of the well.

13. The method of claim 1, wherein the straight fiber and the crimped fiber are both polyester fibers.

14. The method of claim 13, wherein the straight fiber and the crimped fiber are both polylactic acid fibers.

15. The method of claim 1, wherein the second diameter of the crimped fiber is about one third of the first diameter of the straight fiber, and wherein the first length of the straight fiber and the second length of the crimped fiber is about 6 mm.

16. The method of claim 3, wherein the straight fiber:crimped fiber weight ratio is between 25:75 and 75:25.

17. The method of claim 16, wherein the straight fiber:crimped fiber weight ratio is between 40:60 and 60:40.

18. The method of claim 17, wherein the straight fiber:crimped fiber weight ratio is about 50:50.

19. A method for treating a well, comprising:
(i) drilling a well with a water-base mud, oil-base mud, a synthetic-base mud or an emulsion mud;
(ii) depositing a mud filtercake on a wellbore wall;
(iii) preparing a well cleaning composition that comprises a carrier fluid, a salt, a surfactant, a mutual solvent, and at least two fibers selected from the group consisting of natural celluloses, polylactic acid, polyesters, polyvinyl alcohol and polyethylene terephthalate, wherein the at least two fibers have lengths between 1 mm and 20 mm and diameters between 10 μm and 50 μm; and
(iv) circulating the well cleaning composition in the well, thereby removing the mud filtercake from the wellbore wall;
wherein a first fiber of the at least two fibers is a straight fiber and a second fiber of the at least two fibers is a crimped fiber, and wherein a first length of the straight fiber is about equal to a second length of the crimped fiber, and a first diameter of the straight fiber is substantially larger than a second diameter of the crimped fiber, wherein the straight fiber and the crimped fiber are both polyester fibers, and wherein the filtercake removal arises from a scrubbing action performed by the at least two fibers.

20. The method of claim 19, wherein the surfactant is one or more members of the group consisting of long chain alcohols, polyoxyethylene glycol alkyl ethers, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide DEA, cocamide MEA, dodecyldimethylamine oxide, block copolymers of polyethylene glycol or polypropylene glycol, polyethoxylated tallow amine, ammonium lauryl sulfate, sodium lauryl sulfate, sodium laureth sulfate, sodium myreth sulfate, dioctyl sodium sulfosuccinate, perfluorooctane sulfonates, perfluorobutanesulfonates, alkylbenzene sulfonates, alkyl-aryl ether phosphates, alkyl ether phosphates, alkyl carboxylates, sarcosinates, perfluorononanoates, perfluorooctanoates, 3-[(3-Cholamidopropyl)dimethylammonio]-1-propanesulfonate, cocamidopropyl hydroxysultaine, and cocamidopropyl betaine.

* * * * *